United States Patent [19]

Alexander

[11] Patent Number: 5,157,801
[45] Date of Patent: Oct. 27, 1992

[54] DOCK LEVELER HAVING AUTOMATICALLY ACTUATED VEHICLE BARRIER

[75] Inventor: James C. Alexander, London, Canada

[73] Assignee: The Serco Corporation, Canada

[21] Appl. No.: 650,373

[22] Filed: Jan. 30, 1991

[51] Int. Cl.⁵ .............................................. E01D 1/00
[52] U.S. Cl. ...................................................... 14/71.3
[58] Field of Search ......................... 14/69.5, 71.1–71.3

[56] References Cited

U.S. PATENT DOCUMENTS

| | | |
|---|---|---|
| 3,872,948 | 3/1975 | Richards . |
| 4,155,468 | 5/1979 | Royce . |
| 4,920,598 | 5/1990 | Hahn ..................... 14/71.1 |
| 5,040,258 | 8/1991 | Hahn et al. ............. 14/71.3 |

FOREIGN PATENT DOCUMENTS 2852888  8/1980  Fed. Rep. of Germany .

OTHER PUBLICATIONS

Atlantic Company, Model AH Hydraulic Dock Levelers, Model AH Hydraulic Scissor Tables Specifications, 1 page.

*Primary Examiner*—Ramon S. Britts
*Assistant Examiner*—Nancy Connolly
*Attorney, Agent, or Firm*—Sughrue, Mion, Zinn, Macpeak & Seas

[57] ABSTRACT

A dock leveler has a barrier actuated by movement of the lip. The barrier is mounted for pivotable movement to be flush with the deck when the lip is extended. As the lip is lowered an arm contacts a guide plate mounted on said carrier to rotate said barrier upward. As said lip raises the guide plate lowers by gravity.

8 Claims, 3 Drawing Sheets

DOCK LEVELER HAVING AUTOMATICALLY ACTUATED VEHICLE BARRIER

BACKGROUND OF THE INVENTION

This invention relates to dock loading equipment and in particular to a dock leveler assembly having a barrier which automatically protrudes to prevent vehicles from accidentally running off the front end of the leveler.

Dock leveler assemblies are known and widely used to accomplish the loading and unloading of vehicles which are parked at a loading dock platform. The art is replete with many examples of such dock leveler systems. Generally, they comprise a deck assembly which is mounted in the dock to compensate for variations in height between the fixed loading dock platform and the bed of the vehicle to be loaded and unloaded. Such dock levelers are equipped with a pivotally mounted plate or lip on the front end which serves as a bridge between the leveler and the bed of the vehicle. In use, forklift trucks or the like traverse between the dock and the vehicle across the deck of the leveler and the lip for purposes of moving materials from the vehicle on/off the dock. A safety problem which frequently occurs is that such forklift trucks and the like may run off the exposed end of the dock when no vehicle is parked adjacent thereto.

Within the prior art various techniques have been proposed to provide a physical barrier for the prevention of such run-off of the end of the dock surface. For example, levelers used by the U.S. Post Office employ a lip which extends to the rearward behind the lip hinge so that when the lip falls the rear portion is raised to form a barrier. By this technique, the lip is pivotally fixed to the front edge of the dock having a pivot access of the lip set back from the rear edge thereof. Thus, the rear section of the extending lip between the pivot axis and the lip rear edge projects above the dock ramp surface and forms a barrier. A problem occurring in this system is that a pinch-point hazard exists if the operators foot is near the front of the leveler when the lip is extended.

Another solution is set forth in U.S. Pat. No. 4,920,598, which employs a lip having a series of slots which, when the lip is in its stored depending position and stored by lip keepers provides a projection above the dock leveler surface. When the leveler is moved from its inoperative, stored, position the lip plate slides on the slots downward thus automatically retracting the protruding lip portion forming the barrier and allowing the lip to be raised by hydraulic techniques or the like for normal use.

The solution proposed in the '598 patent has several weaknesses associated with the configuration. First, because it employs a slotted mounting for the lip structure is inherently weakened. Moreover, the sliding components will tend to bind due to wear, corrosion, adverse weather and the like. Secondly, the barrier protrudes between the hinges about which the lip extends. Consequently, the hinge structure itself is weakened because of removal of portions of the hinge tubes thereby eliminating a significant amount of the shear resistance of the hinge pin.

The system also adds a degree of unnecessary complexity to the dock leveler structure by requiring a movable stop to permit the barrier to be lowered.

An alternative embodiment which uses pop-up portions hydraulically actuated defines, at best, an intermittent barrier still suffering from many of the same deficiencies such as weakness of the hinge pin.

Importantly, both the '598 and the prior art "Post Office" configuration are actuated only at dock level. A hazardous condition exists in end-loading below dock level where the leveler slopes downward and any material handling equipment on the leveler is more likely to roll. That is, the leveler is canted downward such that by gravity objects and the like will tend to roll off the end of the dock. End loading is a necessary function of the use of the dock leveler to permit unloading of a vehicle where the cargo is too close to the rear of the truck such that the lip cannot extend. Generally, unloading of a vehicle in that condition can be done with the leveler in the stored cross-traffic position where it is flush with the dock surface. However, if the truck bed is lower than the leveler the lip must be extended slightly beyond the lip keepers and the leveler is then lowered to a below dock position to permit such unloading to take place. In this position the leveler slopes downward away from the loading dock. Neither the '598 patent nor the Post Office design would have a barrier in place in that condition which is the most dangerous since vehicles can run off the end of the dock by rolling movement down the slope. Moreover, in the case of the '598 configuration any truck bed lower than the top of the barrier would require such below dock end loading.

SUMMARY OF THE INVENTION

Given the deficiencies in the prior art it is an object of this invention to provide an improved barrier for dock levelers that is activated by the folding of the lip. With this mode of implementation, the barrier will be effective during end loading below dock level as well as when the dock is stored at dock level.

Another object of this invention is to provide an improved barrier for a dock leveler where the barrier is actuated up by the lip but falls by gravity itself thereby eliminating pinch hazards to loading dock workers.

Yet another object of this invention is to provide for a barrier usable with a dock leveler that retains strength and simplicity of the conventional lip and hinge structure of dock levelers.

These and other objects of this invention are accomplished by means of an automatic vehicle barrier which is hinged on the dock leveler surface to be maintained flush with the top of the deck assembly. The lip carries with it a lever which rotates as the lip is lowered. The lever contacts a surface of the guide plate thus pushing up the barrier as the lip is lowered. The barrier raises automatically every time the lip is lowered. Conversely, when the lip is raised by means of actuation of the deck assembly, the lever pivots with the lip such that when it rotates, the barrier will fall back into the stored position on the deck assembly by force of gravity. Given the fact that the barrier is supported by the structural elements of the deck assembly it provides strength to withstand normal loads of transit during operation of the leveler.

This invention will be described in greater detail by referring to the attached drawing and the description of the preferred embodiment which follows.

DESCRIPTION OF THE PREFERRED EMBODIMENT

Figure 1:
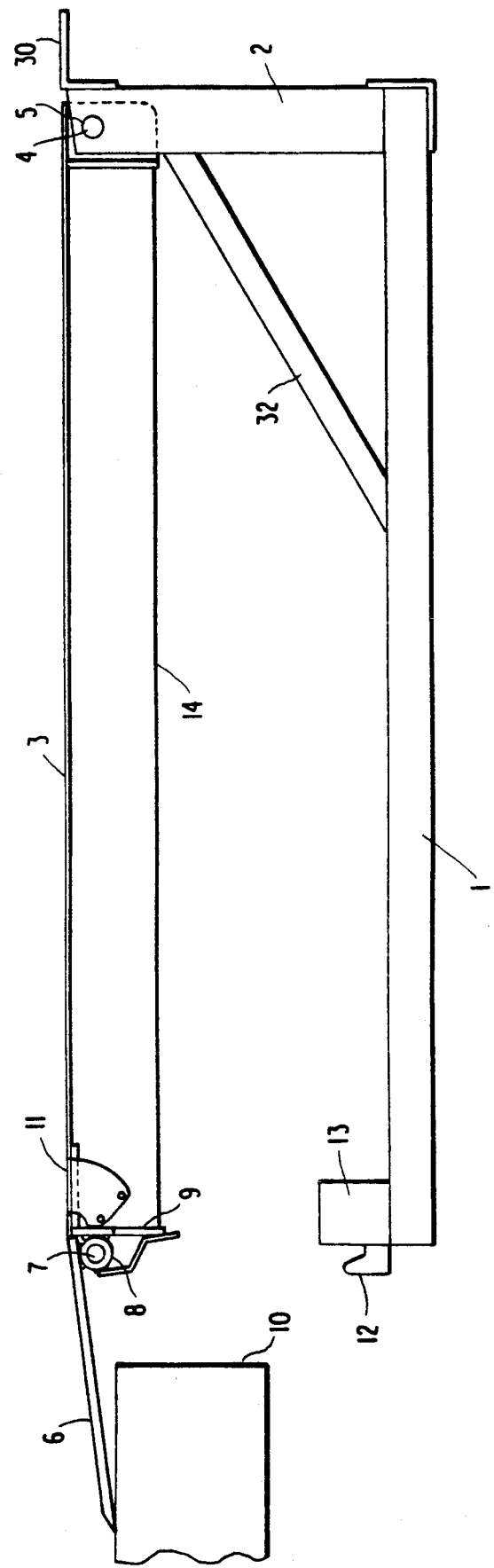
FIG. 1 is a side elevation view of a dock leveler with the lip extended illustrating the position of the automatic vehicle barrier in accordance with this invention.
Figure 2:
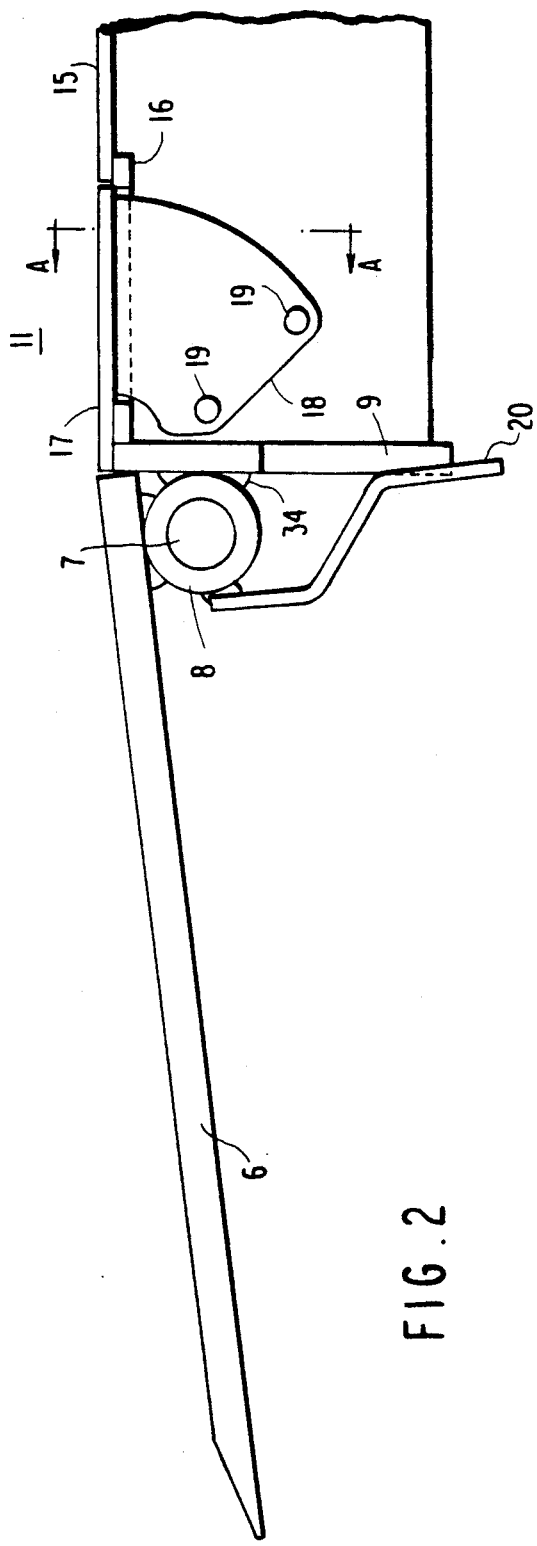
FIG. 2 is an enlarged cross section of the preferred embodiment of FIG. 1 showing additional details of the automatic barrier of the first embodiment.
Figure 3:
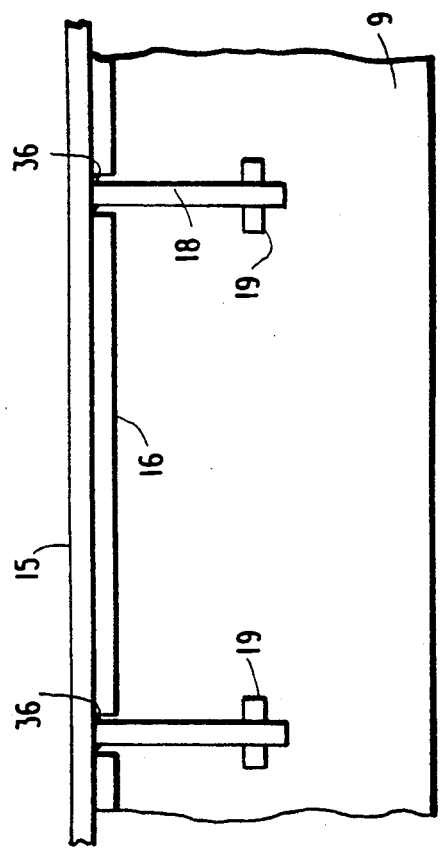
FIG. 3 is a sectional view along line 3—3 of FIG. 2.

Referring now to FIGS. 1, 2, and 3 a first preferred embodiment of this invention will be described. A frame 1 has rear frame members 2 to define a rigid assembly for the mounting of the deck assembly. The frame members 2 and 3 may be pit mounted or otherwise recessed relative to the elevation of the loading dock 30. Suitable bracing elements 32 may be employed to improve the rigidity of the frame assembly.

The deck assembly 3 pivots about pins 4 which pass through holes 5 in the rear frame member 2. A lip assembly 6 pivots about a hinge pin 7 passing through hinge tubes 8 which are fastened to front bars 9 of the deck assembly 3. As illustrated in FIG. 2, affixation of the hinge pins can be by welds 34 or the like.

FIG. 1 illustrates the lip 6 extended to rest on the bed of a truck or other vehicle 10. As is well known in the technology, the deck assembly with the extended lip is elevated and held in position by means of springs, hydraulic systems or other mechanical devices. Such are not shown because they form no part of this invention.

In accordance with this invention an automatic vehicle barrier 11 is employed. FIGS. 1 and 2 illustrate the barrier 11 in the stowed position. As illustrated in FIGS. 1 and 2 in the stowed position the barrier is maintained flush with the top surface of the deck assembly 3. Lip keepers 12 are fastened to the front of the frame and are used to support the lip when it is folded down, that is in the pendant position. That is, the notch or recess in the lip keepers defines a means by which the lip 6, when in the downward or pendant position, is maintained locked so that it cannot pivot upward exposing the underside of the leveler. Support blocks 13 contact the front bars 9 and support the leveler when it is in the lowest position and when the lip is not supported by the truck bed. That is, in the below dock position the front bar 9 will contact the support blocks 13 with the deck assembly 3 angled downwardly. Beams 14 provide structural support to the underside of the deck assembly.

As illustrated in FIG. 2, with the lip 6 extended the automatic vehicle barrier 11 is maintained in a flush position. This is accomplished because the deck plate 15 is shorter than the overall length of the deck assembly 3. Structural integrity and strength is maintained by a cross plate 16 positioned between the front bar 9 and the deck plate 15. This allows the formation of a recessed area so that the vehicle barrier cover plate 17 can sit flush with the top of the leveler.

A series of guide plates 18 hold the barrier plate 17 in position. The guide plates fit through a series of slotted holes 36 in the plate 16. Such is illustrated in FIG. 3. Pins 19 are inserted through holes in the guide plates 18 to limit upward travel of the barrier. Thus, as illustrated in FIG. 4, with the barrier in an upright position the pins 19 abut against the plate 16 to prevent further motion of the barrier.

Figure 4:
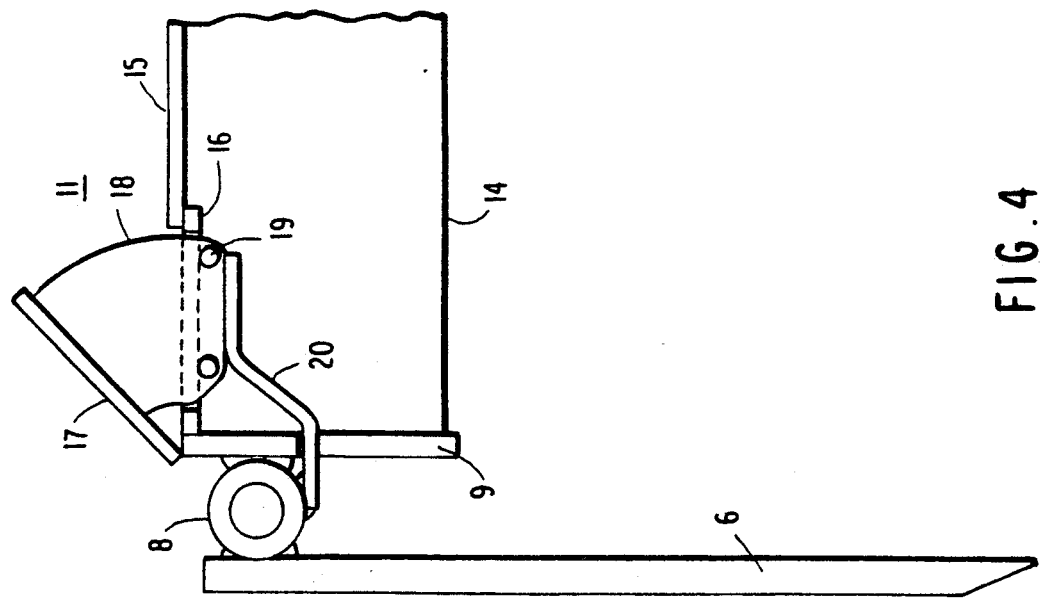
FIG. 4 is an enlarged cross sectional view similar to FIG. 2 illustrating actuation of the barrier with the lip in the pendant position.

FIG. 4 illustrates a cross section of the front portion of the leveler in FIG. 1 with the lip in the folded pendant position. It is immaterial whether the lip is resting in the lip keepers 12. The important aspect of this invention is that with the lip in the downward pendant position a lever 20, which is attached to one or more the lip hinge tubes 8, rotates to contact the guide plates 18. This causes the barrier 11 to be raised as illustrated in FIG. 4. Wheels of any material handling vehicle, such as a fork lift truck, which tend to roll toward the front of the leveler would thus strike the rear edge of the vehicle barrier and be stopped. The pins 19 contacting the underside of the plate 16 limit further rotation of the vehicle barrier.

When the lip is extended, as illustrated in FIG. 1, so that the dock leveler is in an operative position the levers 20 rotate counterclockwise thus allowing the barrier to fall by its own weight into the recess provided in the top of the leveler. Should a person's foot or any other object be in the vicinity of the barrier however it will not be forced down by the lip as it extends and thus, a hazardous pinch point is avoided. Rather, only the weight of the barrier itself would be involved.

Figure 5:
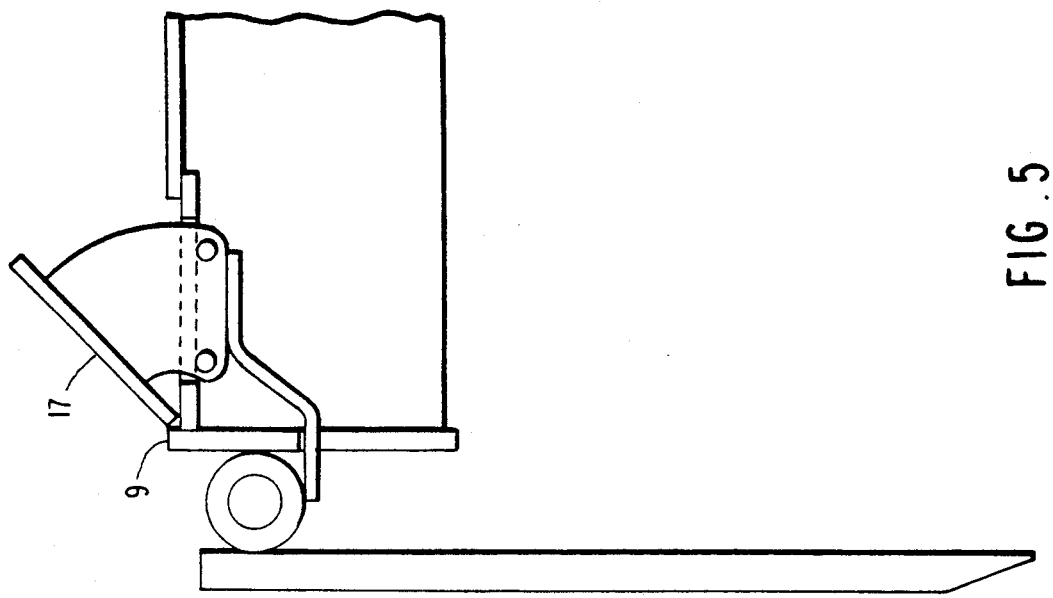
FIG. 5 is an enlarged cross sectional side view of the front portion of a dock leveler illustrating a second preferred embodiment of this invention.

Referring now to FIG. 5 a second preferred embodiment is illustrated. In FIG. 5 the front bar 9 is raised to the top of the leveler. The edge of the barrier with the top plate 17 is thus supported by the upper portion of the front bar 9 providing greater strength to withstand loads. In all other respects the embodiment is the same as the first preferred embodiment as illustrated in FIGS. 1-4.

A further enhancement of the system would be to have lever 20 made of a resilient material so that if the lip is folded with the barrier held down by an object resting on it the mechanism would not be damaged. The barrier would raise automatically when the object was moved given the resilient action of the lever 20 with its spring like configuration.

One of working skill would recognize that other modifications of this invention can be practiced without departing from the essential scope thereof. The essential aspects of this invention are to provide a barrier which is raised by having the lip falling and one which is not forced down as the lip extends as a function of lip actuation itself.

Having described my invention, I claim:

1. A dock leveler assembly comprising;
   a pivotally mounted dock leveler having a deck and a lip, said lip pivotably mounted to one end of said deck, said lip movable from a pendant stored to position to an outwardly extending operative position;
   a barrier mounted on said deck for movement from a position substantially flush with said deck to a position protruding above said deck and,
   means responsive to movement of said lip for moving said barrier from said flush position to said protruding position as said lip is lowered into said pendant position, said means being detached from said barrier so as to be separable therefrom when said lip is raised whereby said barrier moves to said flush position solely by its own weight.

2. The dock leveler of claim 1 wherein said deck has a front bar and said barrier rests on said front bar when in said substantially flush position.

3. The dock leveler of claim 1 wherein said deck has a front bar and said barrier is recessed to be substantially flush with the top of said front bar when in said substantially flush position.

4. The dock leveler of claim 1 wherein said lip comprises a substantially flat lip plate, a hinge tube coupled to said lip plate and a lever coupled to said hinge tube.

5. The dock leveler of claim 4 wherein said barrier comprises a barrier plate, a guide plate coupled to said barrier plate and means carried by said guide plate contacting said lever for raising said barrier as said lip is moved into said pendant position.

6. The dock leveler of claim 4 wherein said lever is made from resilient material.

7. The dock leveler of claim 5 wherein said deck plate has a slot and said guide plate moves through slot.

8. The dock leveler of claim 5 wherein said deck plate has a series of slots, said barrier having a plurality of guide plates, said means carried by said guide plate comprising a protruding pin and said guide plates movable through said slot.

* * * * *